United States Patent [19]

Stevenson et al.

[11] Patent Number: 4,919,124
[45] Date of Patent: Apr. 24, 1990

[54] AIRCRAFT AIRCREW LIFE SUPPORT SYSTEMS

[75] Inventors: George F. Stevenson; Ronald F. Cassidy, both of Yeovil, England

[73] Assignee: Normalair-Garrett (Holdings) Ltd., Somerset, England

[21] Appl. No.: 282,571

[22] Filed: Dec. 12, 1988

[30] Foreign Application Priority Data

Dec. 18, 1987 [GB] United Kingdom ............... 8729501

[51] Int. Cl.[5] ........................................... A61M 15/00
[52] U.S. Cl. ............................ 128/202.26; 128/205.24
[58] Field of Search ...................... 128/202.26, 205.11, 128/205.24

[56] References Cited

U.S. PATENT DOCUMENTS

| | | | |
|---|---|---|---|
| 3,675,649 | 7/1972 | Basham et al. | 128/205.11 |
| 3,875,957 | 4/1975 | Veit et al. | 128/205.11 |
| 4,121,578 | 10/1978 | Torzala | 128/205.11 |
| 4,206,754 | 6/1980 | Cox et al. | 128/205.11 |
| 4,428,372 | 1/1984 | Beysel et al. | 128/202.26 |
| 4,602,653 | 7/1986 | Ruiz-Vela et al. | 128/205.11 |
| 4,648,397 | 3/1987 | Beale | 128/205.11 |

Primary Examiner—Edgar S. Burr
Assistant Examiner—Aaron J. Lewis
Attorney, Agent, or Firm—Larson & Taylor

[57] ABSTRACT

An aircrew life support system has an on-board oxygen generating system (OBOGS) connected for delivering oxygen-enriched product gas to a breathing demand regulator and a plenum storage container. The concentration of oxygen in the product gas is sensed by a gas concentration sensor which supplies signals to an electronic control unit (ECU). The ECU outputs signals for switching a control valve which controls product gas to be delivered to the regulator from either the OBOGS or the storage container. The ECU also outputs signals to a charge valve which is opened to allow product gas from the OBOGS to charge the storage container when product gas enriched with oxygen above a predetermined concentration is being delivered by the OBOGS and there is excess capacity over the demand requirements at the regulator. The breathing demand regulator provides for mixing of the OBOGS product gas or of the stored gas with cabin air to provide a breathing gas matched to physiological requirements under all operational conditions, both normal and emergency and, especially to provide for long-term sea level breathing from the stored gas when the OBOGS in not operating.

8 Claims, 1 Drawing Sheet

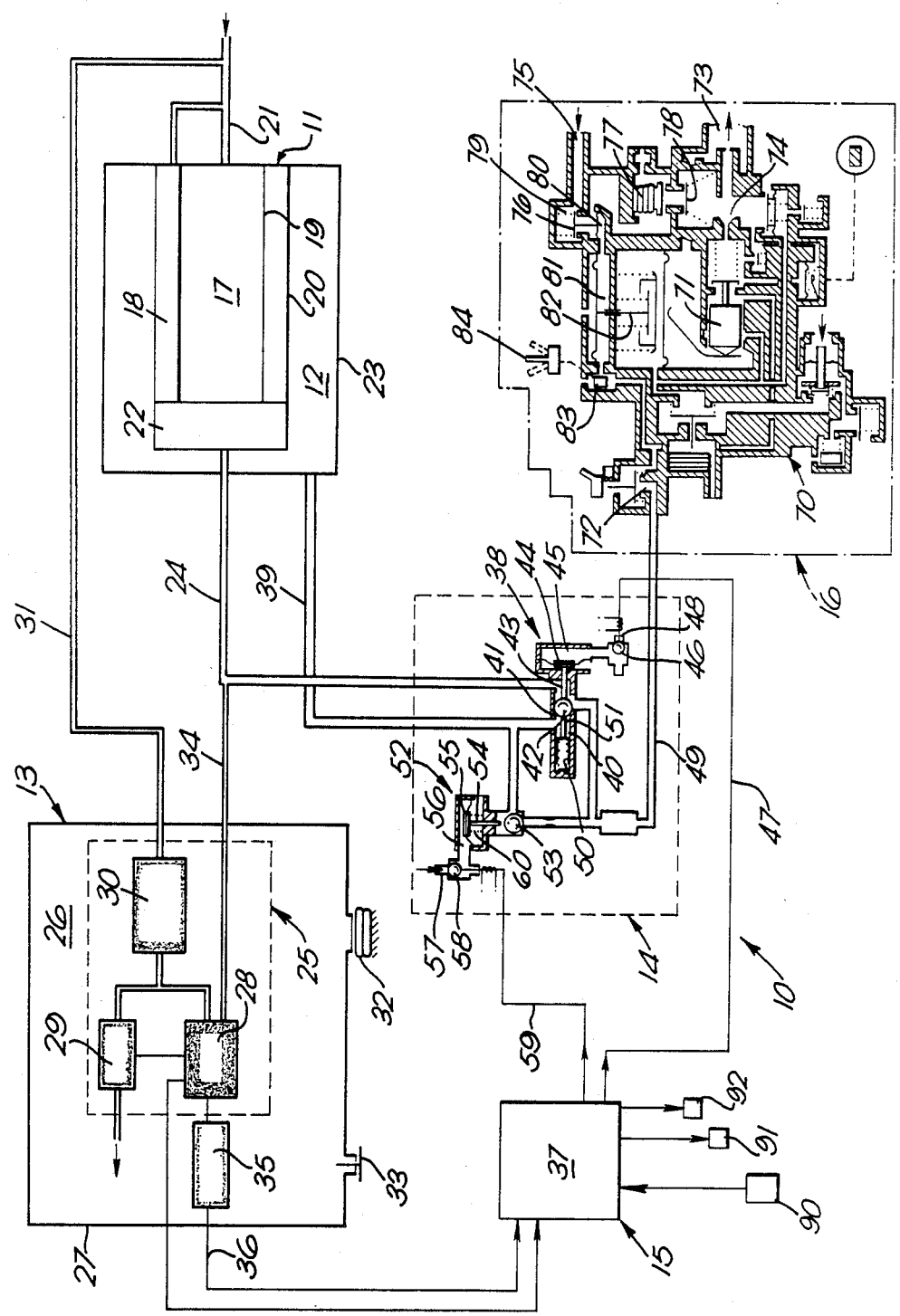

AIRCRAFT AIRCREW LIFE SUPPORT SYSTEMS

This invention relates to aircraft aircrew life support systems and is particularly concerned with a system which includes an aircraft on-board oxygen generating system.

It is increasing practice in aircrew life support systems to supply breathable gas to the aircrew from an on-board oxygen generating system (OBOGS). Whereas in systems that produce breathable gas as from stored oxygen (compressed gas or liquid) the breathable gas is typically derived by dilution of the stored oxygen as by admixture with cabin air to produce a gas of the appropriate oxygen concentration, OBOGS are usually arranged to produce a breathable gas that has the appropriate oxygen concentration for breathing under the prevailing operational conditions, so that dilution of the product gas is not required. In this connection it should be noted that for most operational conditions it is required that the partial pressure of oxygen in the breathable gas should be held at a constant value, which implies that the oxygen concentration must increase as the total pressure decreases, e.g. with increasing altitude.

Thus, for example, in a system disclosed in GB-A-2029257 (Linde) breathing gas produced by a molecular sieve adsorption device is delivered to an aircrew breathing mask by way of a buffer tank. The concentration of oxygen in the breathing gas is regulated by controlling the desorption pressure of the molecular sieve adsorption device and, also, by bleeding breathing gas form the buffer tank to control the flow of air through the adsorption device. As the system delivers breathing gas of desired oxygen concentration there is no requirement for dilution with aircraft cabin air, e.g. to avoid over-oxygenation of aircrew breathing from the system.

U.S. Pat. No. 3,922,149 (Garrett) discloses a system in which breathing gas from a molecular sieve adsorption bed is delivered to an aircrew breathing mask by way of a compressor which increases the pressure of the breathing gas. Some of the breathing gas, at the increased pressure, is stored in a storage tank and used for back flushing the adsorption bed during the purge phase of its cycle. The system delivers breathing gas enriched with oxygen to a concentration which is matched to the aircrew demand and there is no requirement for dilution with aircraft cabin air.

U.S. Pat. 4,428,372 (issued to Linde and now assigned to the present applicant) discloses an OBOGS which delivers breathing gas enriched with oxygen to a concentration suitable for breathing by aircrew at the altitude at which the aircraft is operating.

An emergency gas storage tank is provided in the system and is supplied with some of the produced breathing gas when the concentration of oxygen therein exceeds a predetermined value, stated to be preferably higher than 80% oxygen. Breathing gas is withdrawn from the storage tank for breathing by aircrew only in the event of an interruption of the normal breathing gas supply from the adsorption device. The system does not provide for dilution of OBOGS-produced breathing gas with aircraft cabin air to avoid over-oxygenation of aircrew breathing from the sytem, which means that the emergency breathing gas withdrawn from the storage tank may have an excessive oxygen concentration. However, for short-term emergency use, this is usually of no physiological consequence.

There is now a requirement for an aircrew life support system which has a sufficient stored breathable gas capacity to provide for aircrew breathing whilst the aircraft is on the ground for prolonged periods with the OBOGS non-operational, in addition to the provision of breathing gas in an emergency. This additional requirement could be met by storing breathable gas enriched with oxygen to a concentration suitable for breathing by aircrew at sea level conditions, in addition to storing breathable gas having an oxygen concentration to meet requirements for breathing at higher altitudes in emergency situations, such as failure of the OBOGS or rapid descent at altitude following cabin decompression, when breathable gas of higher than sea level oxygen concentration is required. However provision for storage of gas at two different oxygen concentrations is obviously undesirable for reasons of complexity and capacity.

It is an object of the present invention to provide an aircraft aircrew life support system which meets the aforementioned requirements for a stored breathable gas capacity and which satisfies aircrew breathing demands at all operational altitudes and in emergency conditions, without the disadvantages that would arise from separate storage of breathable gas to meet the disparate requirements of longterm sea level breathing and short-term high altitude breathing, respectively.

This object is met, in accordance with the invention, by an aircraft aifcrew life support system comprising an on-board oxygen generating system (OBOGS), breathing demand regulator means connected for receiving product gas delivered by the OBOGS, plenum storage means connected for receiving product gas delivered by the OBOGS, gas concentration sensor means connected for sensing the concentration of oxygen in the product gas delivered by the OBOGS and for diverting to the plenum storage means OBOGS product gas surplus to breathing demand requirements and of oxygen concentration in excess of a predetermined value, characterised in that the demand regulator means includes means for mixing aircraft cabin air with oxygen-enriched OBOGS product gas obtained either from the OBOGS or from said plenum storage means, to deliver breathing gas that is matched in oxygen concentration to the physiological requirements of the aircrew in accordance with the prevailing operating conditions of the system and the aircraft.

The system may include control means comprising a control value adapted to switch product gas to be delivered to the regulator means from either the OBOGS or the storage means, and a charge valve adapted to control product gas to flow from the OBOGS to charge the storage means when there is an excess capacity of product gas enriched with oxygen at or above a predetermined concentration being delivered by the OBOGS.

The control valve and the charge valve may be solenoid operated.

The control means may be electronic and comprise a microprocessor connected for receiving signals representative of system ambient (i.e. aircraft cabin) and system inlet conditions, the mode of the breathing demand regulator means (i.e. non-dilution or dilution of product gas), and demand flow rates, as well as oxygen concentration signals from the gas concentration sensor.

The microprocessor may be programmed with a mathematical model of the gas concentration process and may compute the received signals against this model so as to output control signals for optimisation of cycling of OBOGS sieve beds to match the measured parameters.

The breathing demand regulator means will preferably include means for switching between a mode in which undiluted oxygen-enriched product gas is delivered to a breathing mask in response to breathing demands of an aircrew member (the non-dilution mode) and a mode in which oxygen-enriched product gas is diluted with aircraft cabin air at the regulator means for delivery in response to breathing demands (the dilution mode).

A life support system in accordance with the present invention may provide breathing gas in an aircraft having more than one aircrew member. In such a multi-crew system selection of the non-dilution mode at any one breathing regulator or the demand regulator means forces the or each other regulator into that mode.

The gas concentration sensor means may comprise any suitable oxygen concentration sensor such as, for example, a zirconia-based electro-chemical sensor, which may in combination with the electronic control means act as a dual function oxygen sensor.

When the breathing demand regulator means is switched to the dilution mode it is important to ensure that product gas of suitably high oxygen concentration, preferably in excess of 90% oxygen, is delivered to the regulator means from either the OBOGS or the plenum storage means. It is necessary, therefore, to ensure that the plenum storage means is charged with product gas of suitably high oxygen concentration. If the oxygen concentration of the product gas falls below the required value this will be sensed by the sensor means and the electronic control means will close the charge valve to inhibit flow of product gas form the OBOGS to the plenum storage means and switch the control valve to connect the regulator means with the plenum storage means.

With the regulator means switched to the non-dilution mode the quality of the product gas (i.e. the oxygen concentration) delivered by the OBOGS to the regulator means can fall to a lower value before action needs to be taken because there is no further dilution at the regulator. In this mode, when the partial pressure of the oxygen in the product gas delivered by the OBOGS falls below a desired value, typically 24.6 kPa (186 mmHg), the control valve is switched to inhibit supply of product gas from the OBOGS to the regulator means and to communicate the regulator means with the plenum storage means.

In an embodiment of the invention which meets this requirement the gas concentration sensor means comprises a flueric partial pressure sensor as disclosed in EP-A-0036285 located in a pressurised chamber which is held at substantially constant pressure irrespective of aircraft operating altitude. Signals output by a flueric amplifier connected with the sensor bridge outputs are fed to a pressure transducer which is also contained within the pressurised chamber. Because the sensor is pressure referenced to a substantially constant pressure the signals output by the pressure transducer are indicative of oxygen concentration in sample product gas fed to one leg of the bridge. If an oxygen partial pressure value is required then the oxygen percentage concentration signal is combined with a total pressure signal (i.e. aircraft cabin pressure) in the electronic control means.

The chamber containing the flueric partial pressure sensor may be pressurised by the outflow of gas from a flueric aspirator or ejector which drives the sensor and pressure in the cahmber may be controlled by valve means, such as an aneroid capsule valve, sensitive to chamber pressure to allow gas to bleed from the chamber.

The OBOGS preferably comprises two molecular sieve beds and a surge chamber for storing a volume of gas delivered by the sieve beds so that the aircrew member is protected against pressure drop when the beds change between adsorption and desorption phases.

The two sieve beds may be provided in concentric containers which together with the surge chamber may be housed internally of the plenum storage means.

The plenum storage means (and, if desired, the surge chamber in a system having the same) may be filled with an adsorbent material, for example zeolite or carbon material, to increase the quantity of gas which can be stored in the available space. Additionally or alternativley, means may be provided to compress gas delivered to and stored in the plenum storage means, to increase the effective storage capacity.

BRIEF DESCRIPTION OF THE DRAWING

The single drawing is a schematic diagram with parts shown in section of the preferred embodiment of an aircraft aircrew life support system.

Referring to the drawing, an aircraft aircrew life support system 10 includes an OBOGS 11, plenum storage means 12, gas concentration sensor means 13, valve means 14 responsive to signals from electronic control means 15, and breathing demand regulator means 16.

In this embodiment the OBOGS 11 comprises two molecular sieve beds 17, 18 of a zeolite material having an affinity for retaining nitrogen and allowing oxygen to pass. The sieve beds 17, 18 are provided internally of concentric containers 19, 20. Supply air for the OBOGS is derived from engine bleed air and is delivered to the beds 17, 18 by a supply line 21. The beds are cycled through onstream adsorption and offstream desorption phases by the electronic control means 15 and valve means (not shown) in a known operating manner. Oxygen-enriched product gas is delivered by the beds to a surge chamber 22 which reduces the effect on an aircrew member breathing the product gas of pressure troughs which occur when the beds change between adsorption and desorption phases.

In an alternative non-illustrated embodiment the OBOGS comprises three sieve beds and the surge chamber is not required.

The concentric containers 19, 20 and surge chamber 21 are located within a container 23 comprising the plenum storage means 12. To increase the volume of product gas which can be stored in the plenum storage means 12 the space within the container 23 around the concentric containers 19, 20 and surge chamber 21 is filled with an adsorbent material such as zeolite or carbon. The surge chamber 22 may likewise be filled with a similar adsorbent material to increase its capacity for holding product gas. Product gas output from the sieve beds 17, 18 is delivered to the valve means 14 by a delivery line 24 from the surge chamber 22.

The gas concentration sensor means 13 comprises a flueric partial pressure sensor 25 of similar construction to the sensor disclosed in EP-A-0036285. The sensor 25 is located in a pressurised chamber 26 provided by a container 27. The sensor bridge 28 is driven by a flueric aspirator 29 which derives its working gas from a bleed of OBOGS supply air by way of a pressure reducing valve 30 and a supply line 31 tapped off the supply line 21. The exhaust gas from the aspirator 29 is used to pressurise the chamber 26 to a desired pressure say 110 kPa, which is controlled by valve means comprised by an aneroid capsule valve 32. The valve 32 is sensitive to pressure within the chamber 26 to allow exhaust gas to bleed from the chamber in order to maintain a substantially constant pressure therein. A pressure relief valve 33 is provided in the wall of the containe 27 as a safeguard against the pressure in the chamber 26 rising to a dangerous value in the event of malfunction of the aneroid capsule valve 32.

Because the bridge 28 of the sensor 25 is referenced to a constant absolute pressure, signals output by the bridge to a flueric amplifier (not shown but forming part of the sensor 25) are representative of changes in the concentration of oxygen in a sample of product gas fed to one leg of the bridge by a supply line 34 tapped off the product gas delivery line 24. These signals are amplified by the flueric amplifier before being fed to a pressure transducer 35 which is conveniently located in the chamber 26.

Gas concentration signals from the pressure transducer 35 are passed by a signal line 36 to an electronic control unit (ECU) 37 comprising a microprocessor. Signals from the ECU 37 are used for control of the valve means 14 as will hereinafter be described.

The valve means 14 includes a control valve 38 which is responsive to signals from the ECU 37 to control product gas to be delivered to the demand regulator means 16 from either the surge chamber 22 or the plenum storage container 23. The product gas delivery line 24 from the surge chamber 22 and a gas flow line 39 from the plenum storage container 23 are connected to the valve 38 on either side of a passage 40 in the valve body. A valve seat 41 provided in the passage 40 is adapted for closure by a ball valve member 42. As shown in the drawing the ball valve member 42 is held in a closed position with the valve seat 41 by a stem 43 projected by a diaphragm mounted plate 44. The diaphragm is secured to the valve body and defines therewith a chamber 45 which is pressurised by a bleed of pressurised gas from a convenient source. Pressure in the chamber 45 is maintained by a solenoid-operated valve 46, the solenoid valve being activated by a signal from the ECU 37 passed by a signal line 47 to close a vent port 48 from the chamber 45 to allow pressure to build in the chamber and be effective on the diaphragm mounted plate. With the ball valve member 42 in a position closing with the valve seat 41 the product gas delivery line 24 is communicated with a supply line 49 from the valve 38 to the regulator means 16 whereby the regulator means receives oxygen-enriched product gas from the surge chamber 22. When the solenoid-operated valve 46 is deactivated the port 48 is opened and pressure in the chamber 45 is vented to ambient. The ball valve member 42 is then urged by a spring 50 acting through a stem member 51 positioned diametrically opposite the stem 43 towards closing communication between the product gas supply line 24 and delivery line 49 whereby the delivery line 49 is placed in communication with the gas delivery line 39 from the plenum storage means 12 so that stored gas flows to the regulator means 16.

The valve means 14 further comprises a plenum storage charge valve 52 having a ball valve member 53 adapted for closing communication between the delivery line 49 and the gas flow line 39 for the plenum storage container 23. The ball valve member 53 is held in a closed position by a stem 54 projected by a diaphragm mounted plate 55 which defines within the valve body a chamber 56. The chamber 56 is pressurised to move the diaphragm mounted plate towards a position in which it contacts the ball valve member 53 by a bleed of pressurised gas supplied to the chamber through a port 57 which is adapted for closure by a solenoid operated valve 58. The solenoid valve 58 is activated (as shown in the drawing) by signals from the ECU 37 passed by way of a signal line 59.

With the valve 58 in this position a spring 60 acts on the opposite side of the diaphragm mounted plate 55 to move the stem 54 out of contact with the ball valve member 53. With the ball valve member unloaded the pressure of product gas in the delivery line 49 lifts the ball valve member off its seat and product gas flows from the delivery line 49 to the plenum storage means 12 by way of the flow line 39.

The regulator means 16 comprises a breathing pressure regulator 70 having a balanced spool valve 71 for controlling flow of product gas from an inlet 72 to an outlet 73 which is connected with a breathing mask (not shown) worn by the aircrew member. The regulator 70 is similar in construction and operation to the regulator disclosed in EP-A-0078644 (Normalair-Garrett) but has an additional facility for providing mixture of cabin air with product gas for supply to the breathing mask. Only this air mix facility will be described here.

Product gas passing the valve head of the spool valve 71 enters a chamber 74 which may also receive ambient air from an inlet 75 in the regulator body. Ambient air flows from the inlet 75 to the chamber 74 by way of a diaphragm mounted valve 76, an aneroid valve 77, and a light spring loaded check valve 78. The diaphragm mounted valve 76 is held in a position closing communication between the inlet 75 and chamber 74 by a spring 79. The spring load is overcome to move the valve towards opening by pressure in a chamber 80 acting on the diaphragm of the valve 76. Pressure in the chamber 80 is provided by communicating it with a chamber 81 defined in part by a diaphragm mounted valve 82 which acts under the influence of springs to load the spool valve operating diaphragm whereby the valve head of the spool valve is moved towards increasing communication between the regulator inlet 72 and outlet 73. Pressure in the chamber 81 is provided by a bleed of product gas supplied from the regulator inlet 72 by way of a solenoid-operated valve 83 which may be switched by a manually operated switch 84 to allow product gas to flow to chamber 81 and chamber 80 so that the valve 76 is moved towards opening. Ambient air passing the valve 76 is further metered in flowing to the chamber 74 by the aneroid capsule valve 77 which responds to cabin pressure to reduce the quantity of ambient air supplied to the chamber with increasing altitude. The loading of the spring on the check valve is overcome by the pressure differential it experiences due to the cabin air pressure on one side and reduced pressure on its opposite side as the aircrew member inhales and draws gas from the regulator to his breathing mask. The purpose of the check valve is to prevent product gas escaping from the chamber 74 when the regulator is in a non-dilution mode.

When the regulator is operating in the non-dilution mode it is a requirement that the aircrew member recieve warning of the partial pressure of oxygen in his breathing gas falling below 26.6 kPa (200 mmHg). For this purpose a partial pressure signal is required and in the system of the present invention this is derived by feeding an aircraft cabin pressure signal to the ECU 37 from a cabin pressure sensor 90. By multiplying this cabin pressure signal with the gas concentration signal from the gas concentration sensor means 13 the ECU is able to output a partial pressure signal to a warning device 91.

In operation of the system, when the aircraft is on the ground with its engines off the OBOGS cannot be operated because there is no supply of engine bleed air. In this situation the charge valve is switched to communicate the breathing demand regulator with the plenum storage container and the regulator is switched to the dilution mode so that the aircrew member breathes product gas from the storage chamber diluted with cabin air at the regulator.

With the aircraft engines on and the OBOGS operational, the sieve beds are cycled to deliver product gas enriched with oxygen to a concentration of 90% or greater. This product gas is delivered to the surge chamber and flows from the surge chamber by way of delivery line 24, control valve 38, and delivery line 49 to the regulator, the control valve 38 being suitably switched by a signal from the ECU if the concentration of oxygen in the product gas is 90% or greater.

At low altitudes, up to say 7600 meters, the demand regulator will continue in the dilution mode. Above this altitude the aneroid capsule valve 77 of the regulator expands to close off the supply of cabin air and the aircrew member breathes undiluted product gas.

In normal operation, below 7600 meters altitude, with the dilution mode selected there will be an excess capacity of product gas available from the OBOGS because of high system input pressures and low breathing demand rates of the aircrew member. If this oxygen concentration in the product gas is sensed by the concentration sensor to be greater than 90% and, preferably, greater than 93%, the ECU, which also receives breathing demand flow rate signals, signals the charge valve 52 to open so that excess product gas may flow to charge the plenum storage container.

If for any reason the oxygen concentration in the product gas delivered from the surge chamber of the OBOGS is sensed by the concentration sensor to have fallen below 90%, such as might occur if the OBOGS failed or there was a failure of the air supply to the OBOGS, then the ECU signals the control valve 38 to switch so that flow of product gas form the OBOGS to the regulator is inhibited and the regulator is placed in communication with the storage container. At the same time the charge valve is signalled to close so as to inhibit flow of product gas from the OBOGS to the storage container.

If the system is operating with the demand regulator in the undiluted mode and the partial pressure of oxygen in the product gas falls below a value, say 24.6 kPa, suitable for meeting the breathing requirements of the aircrew member at the operation altitude of the aircraft then the electronic control means signals the control valve to switch so that the aircrew member is supplied with product gas from the storage chamber and flow from the OBOGS to the regulator is inhibited until such time as the partial pressure of oxygen in the product gas delivered by the OBOGS recovers to the required value.

The ECU has a memory containing a mathematical model of the gas concentration process which it uses to compute system inlet signals, gas concentration signals, breathing demand flow rate signals, demand regulator operating mode signals and aircraft cabin pressure signals so as to optimise cycling of the sieve beds to match the measured parameters.

What is claimed is:

1. An aircraft aircrew life support system comprising an onboard oxygen generating system (OBOGS) for delivering oxygen-enriched product gas, breathing demand regulator means connected for receiving oxygen-enriched product gas, said regulator means including means for permitting aircraft cabin air to enter said regulator means and mix with said OBOGS product gas in one operating mode of said regulator means and mode switching means for switching said regulator means betwen a mode in which undiluted OBOGS product gas is delivered in response to breathing demands and a mode in which OBOGS product gas diluted with aircraft cabin air is delivered in response to breathing demands, plenum storage means connected for receiving OBOGS product gas and for supplying said gas to said regulator means, gas concentration sensor means connected for sensing concentration of oxygen in product gas delivered by said OBOGS and adapted to output oxygen concentration signals, an OBOGS product gas supply valve adapted for controlling said OBOGS product gas to be delivered to said regulator means from said OBOGS or said plenum storage means, a plenum storage charge valve adapted for controlling charging of said plenum storage means by said OBOGS product gas, and electronic control means connected for receiving oxygen concentration signals form said gas concentration sensor means and mode signals from said mode switching means and adapted to compute said signals and output control signals to said OBOGS product gas supply valve and said pelnum storage charge valve, whereby when oxygen concentration in product gas delivered by said OBOGS is sensed to have fallen below a predetermined minimum concentration percentage or on failure of OBOGS product gas supply said product gas supply valve is switched to inhibit the flow of product gas from the OBOGS to said regulator and to connect said regulator means with said plenum storage means, and when oxygen concentration is said OBOGS product gas is sensed to be above the predetermined minimum concentration percentage and said regulator means is in a mode in which OBOGS product gas diluted with aircraft cabin air is being delivered in response to breathing demands said plenum storage charge valve is switched to permit OBOGS product gas to charge said plenum storage means.

2. A system as claimed in claim 1, wherein the control valve and the charge valve are solenoid operated valves having their solenoids connected for receiving signals from an electronic control means.

3. A system as claimed in claim 2, wherein the electronic control means comprises a microprocessor.

4. A system as claimed in claim 3, wherein the microprocessor is connected for receiving signals representative of system ambient and system inlet conditions, and breathing demand flow rate.

5. A system as claimed in claim 3, wherein the microprocessor is programmed with a mathematical model of the gas concentration process.

6. A system as claimed in claim 1, wherein the gas concentration sensor means comprises a flueric partial pressure sensor located in a pressurised chamber which is held at substantially constant pressure irrespective of aircraft operating altitude.

7. A system as claimed in claim 1, wherein the OBOGS comprises two molecular sieve beds and a surge chamber for storing a volume of product gas delivered by the sieve beds.

8. A system as claimed in claim 7, wherein the two sieve beds are provided in concentric sieve beds which together with the surge chamber are housed internally of the plenum storage means.

* * * * *